US012714065B2

(12) United States Patent
Chen

(10) Patent No.: US 12,714,065 B2
(45) Date of Patent: Aug. 25, 2026

(54) PET FEEDER USING ORIGINAL FEED PACKAGING BAG AS MAIN CONTAINER

(71) Applicant: Haoshui (Nanjing) Environmental Technology Co., Ltd., Nanjing City (CN)

(72) Inventor: Zhuangyong Chen, Alpharetta, GA (US)

( * ) Notice: Subject to any disclaimer, the term of this patent is extended or adjusted under 35 U.S.C. 154(b) by 9 days.

(21) Appl. No.: 18/851,994

(22) PCT Filed: Mar. 13, 2023

(86) PCT No.: PCT/CN2023/081033
§ 371 (c)(1),
(2) Date: Sep. 27, 2024

(87) PCT Pub. No.: WO2024/159579
PCT Pub. Date: Aug. 8, 2024

(65) Prior Publication Data

US 2025/0204485 A1 Jun. 26, 2025

(30) Foreign Application Priority Data

Jan. 30, 2023 (CN) ......................... 202320148417.7

(51) Int. Cl.
*A01K 5/02* (2006.01)

(52) U.S. Cl.
CPC .................................. *A01K 5/0225* (2013.01)

(58) Field of Classification Search
CPC .................................................... A01K 5/0225
See application file for complete search history.

(56) References Cited

U.S. PATENT DOCUMENTS

2015/0128867 A1 5/2015 Keith

FOREIGN PATENT DOCUMENTS

CN 204499057 U * 7/2015
CN 207328879 U * 5/2018
(Continued)

OTHER PUBLICATIONS

CN 204499057 U Translation (Year: 2015).*
(Continued)

*Primary Examiner* — Kimberly S Berona
*Assistant Examiner* — Steven J Shur
(74) *Attorney, Agent, or Firm* — Noblitt & Newson, PLLC

(57) ABSTRACT

The present utility model relates to the technical field of pet supplies. Disclosed is a pet feeder using an original feed packaging bag as a main container. The pet feeder comprises: a feed box; a funnel, which is arranged at the top of the feed box and is fixedly connected to the feed box; a hole opener, which is arranged in the funnel and is fixedly connected to the inner wall of the funnel; and a feeding box, which is arranged on the outer side of the bottom of the feed box and is in communication with the feed box. In the present utility model, by means of providing the funnel and the hole opener, an original feed packaging bag can be placed on the funnel, and the hole opener is used to make a hole in the original feed packaging bag, such that feed can automatically fall into the feed box, which achieves automatic feeding, eliminates the need to fill the feed box multiple times, and the opened feed bag does not need to be closed again for storage, and the pet feeder is labor-saving, convenient to use, simple and reliable, and has a low cost.

7 Claims, 2 Drawing Sheets

(56) References Cited

FOREIGN PATENT DOCUMENTS

| | | |
|---|---|---|
| CN | 214961829 U | * 12/2021 |
| CN | 215205802 U | * 12/2021 |

OTHER PUBLICATIONS

CN-207328879-U Translation (Year: 2018).*
CN-214961829-U Translation (Year: 2021).*
CN-215205802-U Translation (Year: 2021).*

* cited by examiner

PET FEEDER USING ORIGINAL FEED PACKAGING BAG AS MAIN CONTAINER

TECHNICAL FIELD

The utility model relates to the technical field of pet supplies, and more specifically to a pet feeding machine that uses original feed packaging bags as main containers.

BACKGROUND TECHNOLOGY

Pets refer to animals kept by people to relieve loneliness or for entertainment purposes. Today, pets are defined as animals and plants kept for non-economic purposes. Pets are animals and plants kept for spiritual purposes. They are generally kept to relieve loneliness or for entertainment. In the past, pets were usually animals from the class Mammalia or Avida, because these animals have relatively developed brains and can easily communicate with people. With the improvement of living standards, more and more families keep pets in modern society.

Existing pet feeders have the following problems: The feed needs to be taken out of the packaging bag and filled into a special storage bin. The capacity of the storage bin is usually several times smaller than the original packaging bag, so the storage bin must be filled multiple times; the user must either turn the entire unsealed feed bag upside down and lift it up at an angle. Pour it into the storage bin, which requires strength and precise control, or use a container to scoop the feed out of the bag and transfer it. Both methods waste time and energy; in addition, opened feed bags need to be tied tightly to avoid leakage of smell or moisture. They often attract pests such as cockroaches, rats, etc., or can be opened and eaten by pets on their own.

Therefore, how to provide a pet feeding machine that uses the original feed packaging bag as a feed bin, eliminating the need to refill the bin multiple times and the need to re-close and store the unsealed feed bag is an urgent problem that those skilled in the art need to solve.

SUMMARY OF THE INVENTION

In view of this, the present utility model provides a pet feeding machine that uses the original feed packaging bag as the main container, aiming to solve the problems in the above background technology and realize the use of the original feed packaging bag as a feed bin, eliminating the need for multiple fillings. The bin does not need to be closed again to save the unopened feed bag.

In order to achieve the above purpose, the present utility model adopts the following technical solutions:

A pet feeding machine that uses the original feed packaging bag as the main container, including:

A material box;

A funnel, the funnel is arranged on the top of the material box, and the funnel is fixedly connected to the material box;

A hole opener, the hole opener is arranged in the funnel, and the hole opener is fixedly connected to the inner wall of the funnel;

A feeding box is provided outside the bottom of the material box, and is connected with the material box.

Further, a chute is provided at the bottom of the funnel, a baffle is slidably connected in the chute, and a leak hole is provided in the middle of the baffle, and the leak hole has the same shape and size as the bottom of the funnel.

Furthermore, a handle is provided at one end of the baffle extending out of the funnel, through which the lateral movement of the baffle can be controlled.

Further, it also includes a shield, the shield is arranged vertically, and the shield is detachably connected to the top of the funnel.

Further, the hole opener includes a plurality of hole opening cones, the bottom of the hole opening cone is fixedly connected to the inner wall of the funnel, and the top of the hole opening cone has a cone tip.

Further, the hole opener is conical, with the tapered tip facing upward, the bottom of the hole opener is fixedly connected to the inner wall of the funnel, and the side wall of the hole opener has a flow channel, so the flow channel passes through the hole opener, and the flow channel is connected with the bottom of the funnel.

Furthermore, a feeding opening is provided on the top of the feeding box.

It can be seen from the above technical solution that compared with the prior art, the present utility model provides a pet feeding machine that uses the original feed packaging bag as the main container. By setting up the funnel and the hole opener, the original feed packaging bag can be placed on the funnel, and the hole opener is used to open the hole in the original feed packaging bag, so that the feed will automatically fall into the hatchback, realizing automatic feeding and eliminating the need for multiple times. There is no need to re-close the feed bin to store and open the feed bag, which saves manpower, is convenient and easy to use, is simple and reliable, and has low cost.

DESCRIPTION OF ACCOMPANIED DRAWINGS

In order to explain the examples of the present invention or the technical solutions in the prior art more clearly, the drawings needed to be used in the description of the examples or the prior art will be briefly introduced below. Obviously, the drawings in the following description are only examples of the present invention. For those of ordinary skill in the art, other drawings can be obtained based on the provided drawings without exerting creative efforts.

Wherein: 1 is the feed box; 2 is the funnel; 3 is the hole opener; 31 is the hole opening cone; 32 is the flow channel; 4 is the feeding box; 41 is the feeding port; 5 is the baffle; 51 is the leak hole; 52 is the handle; 6 is the shield.

DETAILED DESCRIPTION OF SPECIFIC EMBODIMENTS

The technical solutions in the examples of the present utility model will be clearly and completely described below with reference to the accompanying drawings in the examples of the present utility model. Obviously, the described examples are only some, not all, of the examples of the present invention. Based on the examples of the present utility model, all other examples obtained by those of ordinary skill in the art without creative efforts fall within the scope of protection of the present utility model.

Example 1

Figure 1:
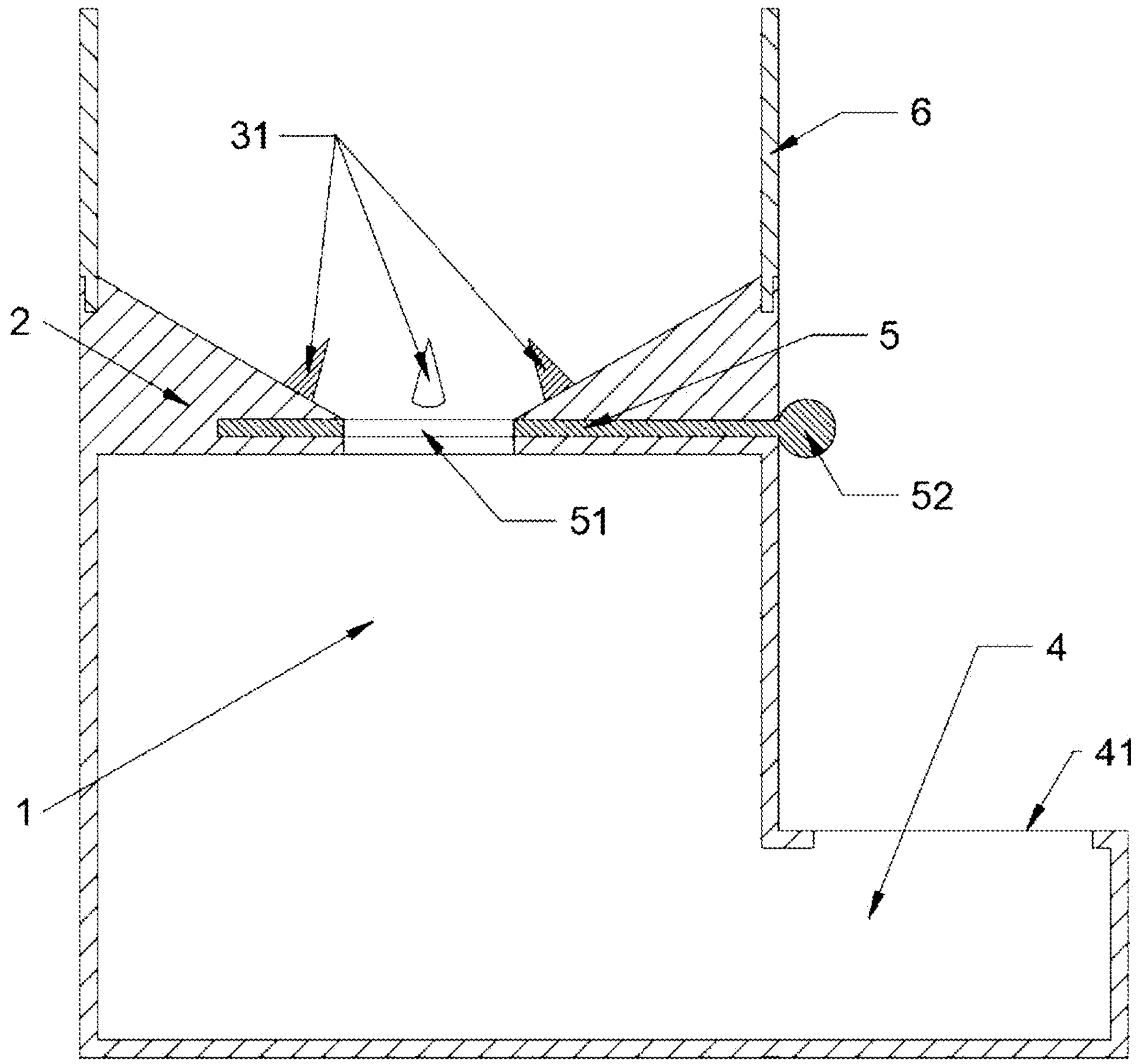
FIG. 1 is an overall structural diagram of Embodiment 1 of the present utility model.
Figure 3:
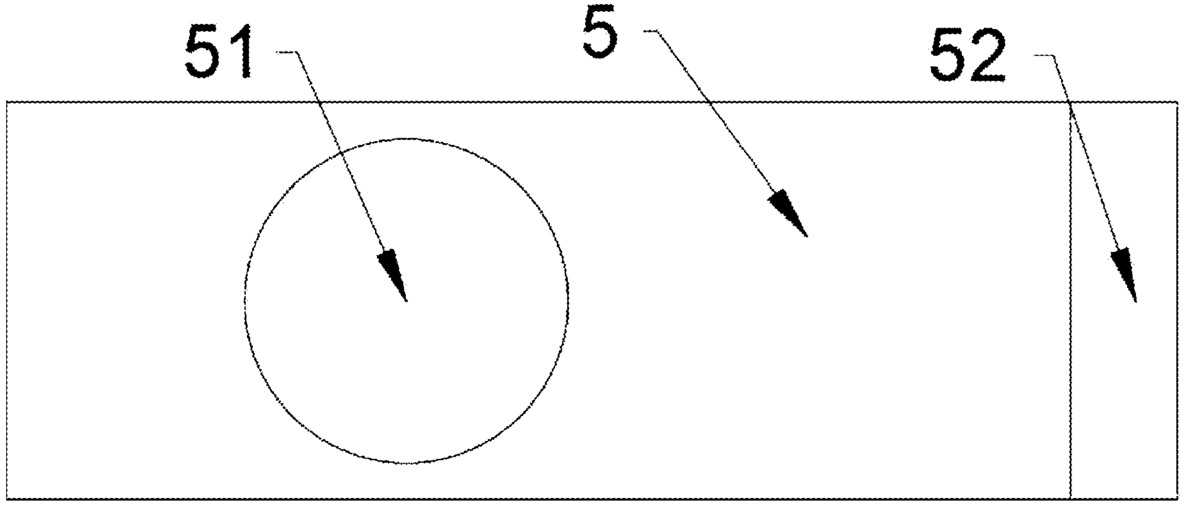
FIG. 3 is a structural diagram of the baffle provided by the utility model.

Referring to FIGS. 1 and 3, the utility model discloses a pet feeding machine that uses the original feed packaging bag as the main container, including:

Material box 1; in this example, the material box 1 is cylindrical, and the top of the material box 1 has an opening, and food can be fed into the material box 1 through the opening at the top of the material box 1.

Funnel 2, funnel 2 is arranged on the top of the material box 1, and the funnel 2 is fixedly connected to the material box 1; in this example, the funnel 2 is conical, the bottom diameter of the conical funnel 2 is smaller, and the top diameter of the cone is larger. The side wall of the funnel 2 has high strength and is used to support the original feed packaging bag and send the feed in the original feed packaging bag into the material box 1.

Hole opener 3, the hole opener 3 is arranged in the funnel 2, and the hole opener 3 is fixedly connected to the inner wall of the funnel 2; in this example, the hole opener 3 is used to open holes in the original packaging bag of the feed, and then passes through the funnel 2 to send the feed into the material box 1.

The feeding box 4 is arranged on the outside of the bottom of the material box 1. The feeding box 4 is connected with the material box 1. In this example, the side wall of the feeding box 4 is connected with the bottom side wall of the material box 1. The feeding box 4 is used for feeding pets.

A chute is provided at the bottom of the funnel 2, and a baffle 5 is slidably connected in the chute. A leak hole 51 is provided in the middle of the baffle 5. The leak hole 51 has the same shape and size as the bottom of the funnel 2. In this example, by controlling the baffle 5, the speed of the feed in the original feed packaging bag flowing to the bin 1 can be controlled during use. When necessary, the baffle 5 can be controlled to seal the bottom of the funnel 2, thereby sealing the original feed packaging bag.

The end of the baffle 5 extending out of the funnel 2 is provided with a handle 52, and the lateral movement of the baffle 5 can be controlled by controlling the handle 52. In this example, the handle 52 is cylindrical. By pushing and pulling the handle 52, the lateral movement of the baffle 5 can be controlled, thereby controlling the flow rate and flow volume of the feed.

The pet feeding machine that uses the original feed packaging bag as the main container also includes a shield 6. The shield 6 is arranged vertically. The shield 6 is detachably connected to the top of the funnel 2. In this example, the top of the funnel 2 is provided with a groove, and the bottom of the shield 6 has a protrusion that matches the groove. The shield 6 is used to better support, fix and protect the feed bag. When the shield 6 is not in use, the shield 6 can be removed.

The hole opener 3 includes a plurality of hole opening cone 31. The bottom of the hole opening cone 31 is fixedly connected to the inner wall of the funnel 2. The top of the hole opening cone 31 has a cone tip. In this example, the cone tip is used to make holes in the original feed packaging bag. When using, place the original feed packaging bag on the funnel 2, and ensure that the bottom of the original feed packaging bag is in contact with the hole opening cone 31, and further rotate the original feed packaging bag. During the rotation process, the top of the hole opening cone 31 cuts open the bottom of the original feed packaging bag, and then the feed falls into the material box 1.

A feeding port 41 is provided on the top of the feeding box 4. In this example, the feeding port 41 is connected with the material box 1, and the feeding port 41 is used for pets to eat.

Example 2

Figure 2:
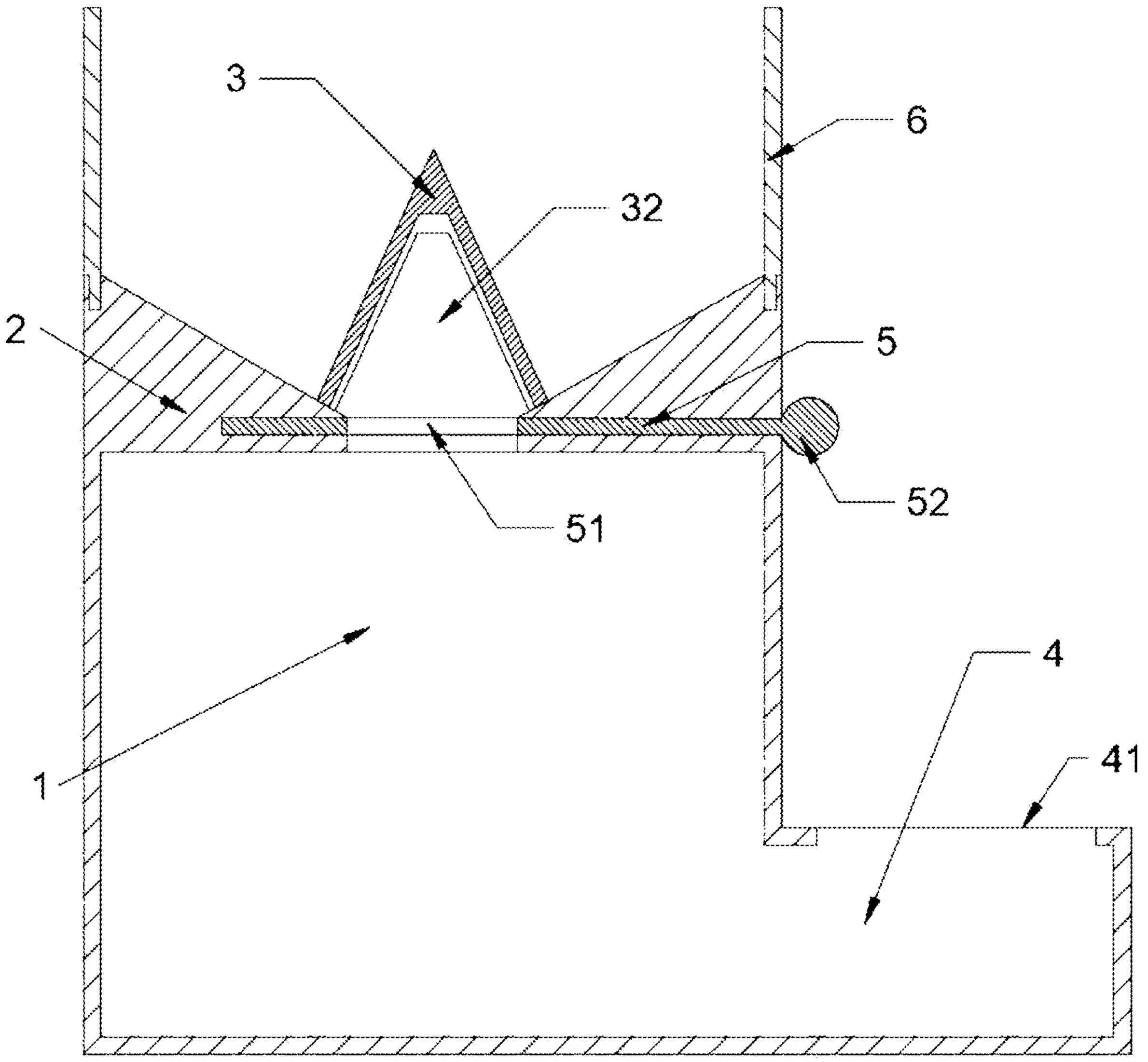
FIG. 2 is an overall structural diagram of Embodiment 2 of the present utility model.

Referring to FIG. 2, the difference between Example 2 and Example 1 is that the hole opener 3 is tapered, the cone tip of the hole opener 3 faces upward, the bottom of the hole opener 3 is fixedly connected to the inner wall of the funnel 2, and the hole opener 3 is fixedly connected to the inner wall of the funnel 2. The side wall has a flow channel 32 that runs through the hole opener 3 and is connected to the bottom of the funnel 2. During use, the original feed packaging bag is placed in the funnel 2, and the top of the tapered hole opener 3 is penetrated into the interior of the original feed packaging bag, and then, the feed inside the original feed packaging bag flows into the material box 1 through the flow channel 32 and the bottom of the funnel 2.

Each example in this specification is described in a progressive manner. Each example focuses on its differences from other examples. The same and similar parts between the various examples can be referred to each other. As for the device disclosed in the example, since it corresponds to the method disclosed in the example, the description is relatively simple. For relevant details, please refer to the description in the method section.

The above description of the disclosed examples enables those skilled in the art to implement or use the present invention. Various modifications to these examples will be readily apparent to those skilled in the art, and the generic principles defined herein may be practiced in other examples without departing from the spirit or scope of the invention. Therefore, the present invention is not intended to be limited to the examples shown herein but is to be accorded the widest scope consistent with the principles and novel features disclosed herein.

The invention claimed is:

1. A pet feeding machine using an original feed packaging bag as a main container, which is characterized by comprising:
- a material box;
- a conically shaped funnel, wherein the funnel:
  - is arranged on the top of the material box;
  - comprises an inner wall forming an inwardly tapering surface configured to receive and support the original feed packaging;
  - is fixedly connected to the material box; and
  - comprises a smaller diameter at a bottom of the funnel than a diameter at a top of the funnel;
- a hole opener, the hole opener is arranged on the inwardly tapering surface proximate the bottom of the funnel, and the hole opener is fixedly connected to the inner wall of the funnel; and
- a feeding box is provided outside the bottom of the material box, and is connected with the material box.

2. The pet feeding machine using an original feed packaging bag as a main container according to claim 1, characterized in that the bottom of the funnel is provided with a chute, a baffle is slidably connected in the chute, and a leak hole is provided in the middle of the chute, wherein the leak hole has the same shape and size as the bottom of the funnel.

3. The pet feeding machine using an original feed packaging bag as a main container according to claim 2, characterized in that one end of the baffle extending out of the funnel is provided with a handle, through which the lateral movement of the baffle can be controlled.

4. The pet feeding machine using an original feed packaging bag as a main container according to claim 1, characterized in that it also includes a shield, wherein the shield is arranged vertically, and the shield is detachably connected to the top of the funnel.

5. The pet feeding machine using an original feed packaging bag as a main container according to claim 1, characterized in that the hole opener includes a plurality of hole opening cones, and the bottom of the opening cone is fixedly connected to the inner wall of the funnel, and the top of the opening cone has a cone tip.

6. The pet feeding machine using an original feed packaging bag as a main container according to claim 1, characterized in that the hole opener is tapered, a cone tip of the hole opener faces upward, the bottom of the hole opener is fixedly connected to the inner wall of the funnel, a side wall of the hole opener has a flow channel, the flow channel runs through the hole opener, and the flow channel is connected with the bottom of the funnel.

7. The pet feeding machine using an original feed packaging bag as a main container according to claim 1, characterized in that a feeding opening is provided on the top of the feeding box and the feeding box shares a sidewall with the material box.

* * * * *